(No Model.) 3 Sheets—Sheet 1.
J. J. CUNNINGHAM & E. H. MULLEN.
APPARATUS FOR REGISTERING VOTES.
No. 595,699. Patented Dec. 21, 1897.
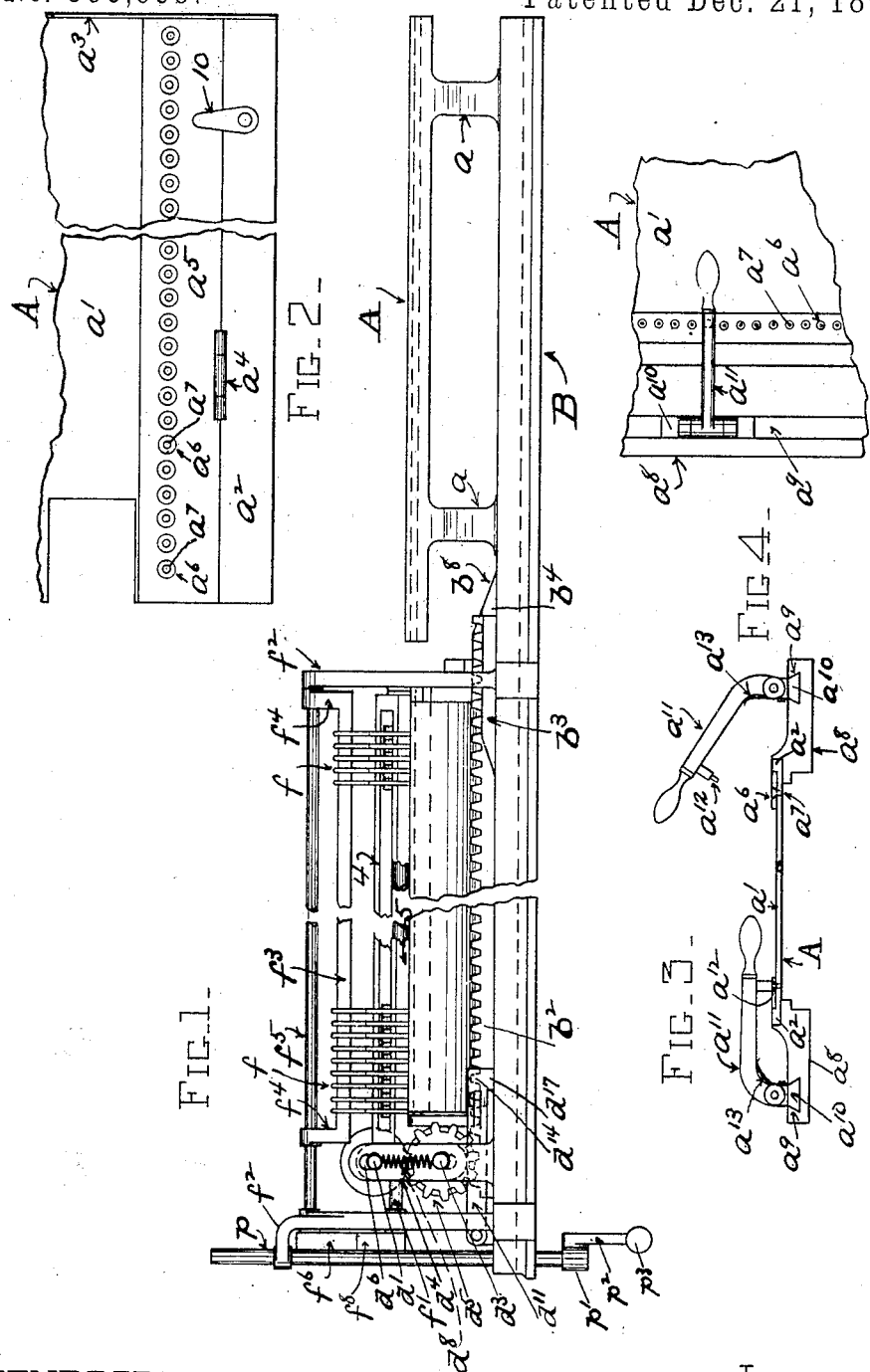
WITNESSES
Fred V. Hart.
George E. Barstow
INVENTORS
James J. Cunningham
and Eugene H. Mullen
By their Attorney
Benjamin Phelps (No Model.) 3 Sheets—Sheet 2.

J. J. CUNNINGHAM & E. H. MULLEN.
APPARATUS FOR REGISTERING VOTES.

No. 595,699. Patented Dec. 21, 1897.

WITNESSES_
Fred V. Hart.
George E. Barstow.

INVENTORS
James J. Cunningham
and Eugene H. Mullen
By their Attorney
Benjamin Phillips (No Model.) 3 Sheets—Sheet 3.

J. J. CUNNINGHAM & E. H. MULLEN.
APPARATUS FOR REGISTERING VOTES.

No. 595,699. Patented Dec. 21, 1897.

WITNESSES:
Fred V. Hart.
George E. Barstow.

INVENTORS
James J. Cunningham
and Eugene H. Mullen
By their attorney
Benjamin Phillips

UNITED STATES PATENT OFFICE.

JAMES J. CUNNINGHAM AND EUGENE H. MULLEN, OF LYNN, MASSACHUSETTS, ASSIGNORS TO JOSIAH Q. BENNETT, TRUSTEE, OF CAMBRIDGE, MASSACHUSETTS.

APPARATUS FOR REGISTERING VOTES.

SPECIFICATION forming part of Letters Patent No. 595,699, dated December 21, 1897.

Application filed January 28, 1896. Serial No. 577,157. (No model.)

*To all whom it may concern:*

Be it known that we, JAMES J. CUNNINGHAM and EUGENE H. MULLEN, citizens of the United States, residing at Lynn, in the county of Essex and Commonwealth of Massachusetts, have invented a certain new and useful Apparatus for Registering Votes, of which the following, taken in connection with the accompanying drawings, is a specification.

The present invention relates to improvements in devices of the above class; and it consists of the combination, with a perforated stencil-ballot, of a movable tally-sheet and a marking device arranged to mark the tally-sheet through the perforations in the stencil-ballot.

The present invention further consists of the devices and combinations of devices hereinafter more fully set forth and claimed.

In the Australian system of voting, which has heretofore been adopted in many of the States in the United States, the names of all candidates are commonly placed upon the same ballot in one or more vertical columns and a vote is cast for an individual candidate by marking the ballot opposite the name of the candidate.

The present invention has for its object to provide an apparatus whereby as each ballot is cast the vote for each individual candidate is recorded upon a tally-sheet, from which it may be readily taken during or at the close of the election.

The use of a registering apparatus involving the present invention in no way injures the ballots, and the same may be retained and, if desired, counted in the usual manner as a check upon the accuracy of operation of the apparatus.

A preferred form of apparatus embodying the present invention is illustrated in the accompanying drawings, in which—

Figure 5:
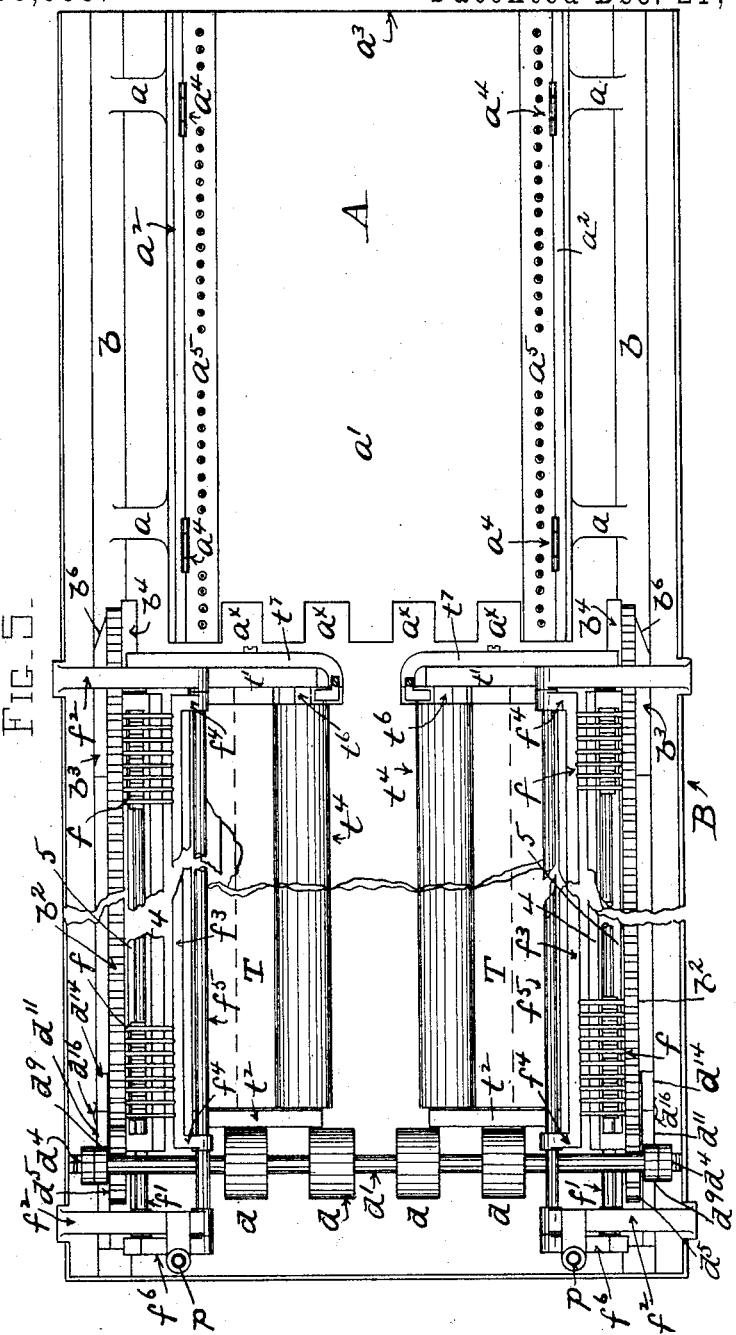
Figure 6:
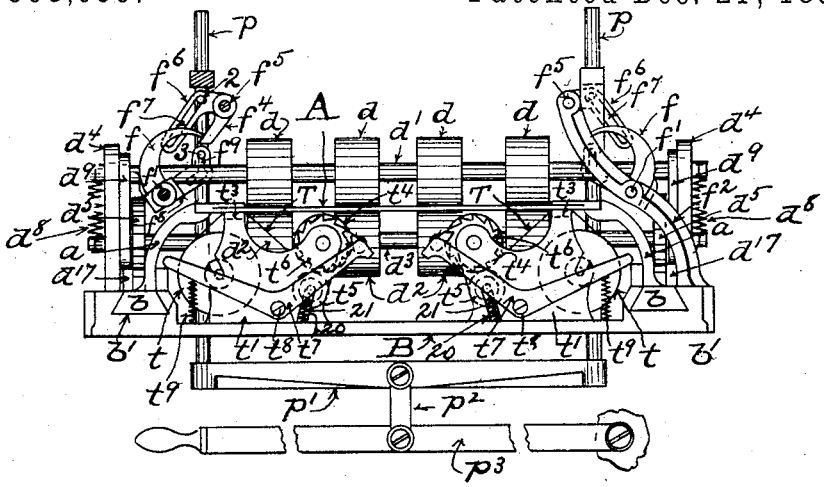
Figures 7, 8:
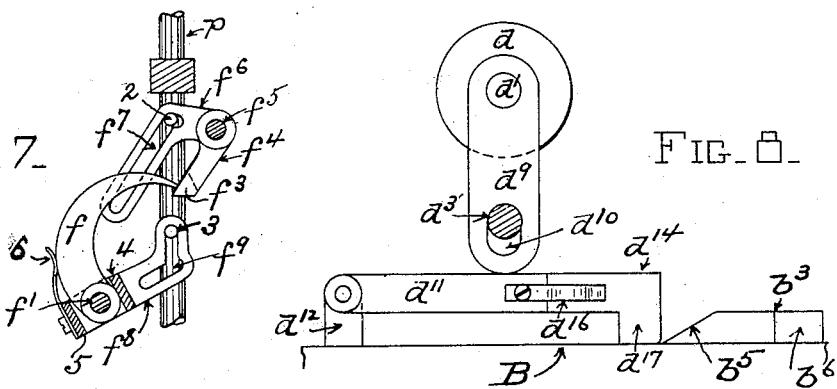
Figure 9:
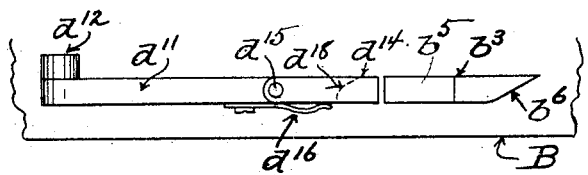

Figure 1 is a side elevation with a portion broken out and a part of the marking device removed to avoid crowding the figure. Fig. 2 is an enlarged plan view of a portion of the ballot-carrier. Figs. 3 and 4 are respectively an end and top plan view of a portion of the device for perforating the stencil-ballot. Fig. 5 is a top plan view of the apparatus as shown in Fig. 1. Fig. 6 is a rear end view. Fig. 7 is a detail view in elevation of a portion of the marking device, and Figs. 8 and 9 are details in elevation and plan of mechanism whereby the ballot is removed from the carrier and passed into the ballot-box.

Similar letters and figures of reference refer to similar parts throughout the several views.

In accordance with the present invention what we have herein termed the "stencil-ballot" is made by the voter from a ballot furnished him at the voting-booth, which may be the usual form of ballot heretofore used in connection with the Australian system of voting.

In accordance with the rules of the Australian system of voting as adopted in most of the States using the same the voter indicates a vote for a candidate by making a cross with a lead-pencil opposite the name of the candidate upon the ballot.

In accordance with the present invention the voter forms what we have termed a "stencil-ballot" by making a series of perforations in the ballot, one opposite the name of each of the candidates thereon for whom he desires to cast a vote, so that when he has completed his stencil-ballot it not only serves to operate in connection with other features of our improved apparatus, as hereinafter described, but after such operation remains as a record of his vote, which it is practically impossible to alter or vary.

We will now describe the mechanism shown in the drawings for forming the stencil-ballot and which we have in practice adopted as insuring the accurate operation of our apparatus.

A represents the ballot-carrier, which is removable from and adjustable upon our apparatus, being conveniently supported and held in position by the shouldered standards $a\ a\ a\ a$. (See Figs. 1 and 6.) The ballot-carrier A conveniently consists of a supporting-plate $a'$, provided with the side flanges $a^2\ a^2$ and the end flange $a^3$, which act as gages for the ballot, so that it may be readily brought into the required position upon the supporting-plate $a'$.

Hinged to the flanges $a^2$ at $a^4\ a^4$ and $a^4\ a^4$ (see Figs. 2 and 5) are the retaining-plates $a^5$ $a^5$, which extend from end to end of the carrier A and act to retain the ballot in position when adjusted upon the supporting-plate $a'$. The retaining-plates $a^5$ $a^5$ may be conveniently locked in position upon the ballot by the buttons 10 10, &c., or other suitable means.

In the retaining-plates $a^5$ $a^5$ are a series of perforations $a^6$ $a^6$ $a^6$, &c., which register with a corresponding series of perforations $a^7$ $a^7$ $a^7$, &c., in the supporting-plate $a'$. For the purposes hereinafter described the walls of each of the perforations $a^6$ are beveled and incline toward the perforation $a^7$. (See Fig. 3.) The relative position of the perforations $a^6$ and $a^7$ is such that when the ballot is adjusted upon the supporting-plate $a'$ and the retaining-plates $a^5$ $a^5$ closed thereon the rows of perforations extend along opposite sides of the ballot, one of each of the registering perforations $a^6$ and $a^7$ coming opposite the names of every candidate upon the ballot.

It may be said in this connection that the apparatus illustrated in the drawings is designed for the ballot now in common use in elections in the State of Massachusetts, which is a double ballot with the names of the candidates in two vertical columns thereon, but it is evident that while a change in the form of the ballot may necessitate a change in the form of the carrier and other features of the apparatus hereinafter described such changes could be readily made by one of average skill in the art and would involve no departure from the present invention.

In connection with our registering apparatus a number of the removable carriers A are supplied, conveniently one for each voting closet or "booth," as commonly called. The ballot is adjusted in the carrier A, preferably by one of the election officers, and handed to the voter, who takes it to one of the voting-booths. In the voting-booth are conveniently provided the shouldered standards $a^8$ $a^8$, to which the carrier A is fitted and which receive the same and hold it in position. The standards $a^8$ $a^8$ extend along opposite sides of the carrier A, and in the base of each of the standards $a^8$ $a^8$ is formed a dovetailed groove $a^9$, to which is fitted a movable carriage $a^{10}$, free to slide along the groove $a^9$ and guided and held in position thereby. Upon the carriage $a^{10}$ is pivoted a lever $a^{11}$, which projects over the plate $a'$ and carries, in position to enter any of the perforations $a^6$ and $a^7$, a punch $a^{12}$. The lever $a^{11}$ is conveniently supported by a spring $a^{13}$ and the punch $a^{12}$ held out of the perforations, so that the carriage $a^{10}$ can be moved along the groove $a^9$. To form the stencil-ballot, the voter moves the punch $a^{12}$ along the edge of the ballot, depressing it into the perforations opposite the name of the candidate for whom he desires to vote, and thereby forming perforations in the ballot at such points. It may be said in this connection that the stencil-ballot may be formed by methods other than that heretofore described without departure from our present invention. When the stencil-ballot has been completed, the carrier A with the ballot therein is again adjusted upon the shouldered standards $a$ $a$ $a$, which are drawn out from under the marking device substantially as shown in Fig. 1.

We will now describe the other features of the apparatus as shown in the drawings; but before doing so we desire to say that we do not consider the present invention as limited to the specific form and arrangement of mechanism herein shown and described, as it is evident that many changes can be made therein which will involve no departure from the present invention, and it being understood that the following detail description is given for the purpose of enabling one skilled in the art to construct an apparatus involving a preferred form of the present invention and without any intention of limiting the invention thereto.

The standards $a$ $a$ on each side of the carrier A are secured to a rod $b$, which is fitted to a dovetailed groove $b'$ in the bed-plate B, which supports the working parts of the machine. The rods $b$ $b$ are free to reciprocate along the grooves $b'$ $b'$, and each carries a rack $b^2$, which actuates the depositing-rolls, a wedge $b^3$, which separates said rolls to allow them to grasp the ballot, and a wedge $b^4$, which actuates the tally-sheet feed.

The depositing-rolls may conveniently consist of a series of rolls $d$ $d$ $d$, &c., mounted upon a shaft $d'$, and a series of similar rolls $d^2$ $d^2$ $d^2$, &c., mounted upon the parallel shaft $d^3$.

The shafts $d'$ and $d^3$ are mounted and free to rotate in suitable bearings in the standards $d^4$ $d^4$, secured to the bed-plate B. The rolls $d$ $d$ $d$, &c., are idle-rolls and may turn with or upon their shaft $d'$, while the rolls $d^2$ $d^2$, &c., turn with the shaft $d^3$, which is rotated by means of a gear $d^5$, which is mounted thereon and which engages the rack $b^2$. The bearings $d^6$ $d^6$ of the shaft $d'$ are vertically elongated, so that the shaft $d'$ is capable of a vertical movement which carries the rolls $d$ $d$ $d$, &c., out of contact with the rolls $d^2$ $d^2$ $d^2$, &c., and brings them into such position that the carrier A can carry the ballot between the same, as hereinafter described. Suitably-placed springs $d^8$ $d^8$ are arranged to normally hold the rolls $d$ and $d^2$ in contact. The shaft $d'$ may be conveniently raised to separate the rolls $d$ and $d^2$ by the following mechanism: From the shaft $d'$ depend the arms $d^9$, which are provided with suitable bearings on the shaft $d'$, in which the shaft $d'$ is free to rotate. The arms $d^9$ are vertically slotted at $d^{10}$ to receive the shaft $d^3$, and their lower ends are supported by the vertically-swinging levers $d^{11}$, pivoted to the stud $d^{12}$ upon the bed B.

The outer portion $d^{14}$ of each of the levers $d^{11}$ is hinged to the inner portion at $d^{15}$ (see Fig. 9) and is free to swing laterally, being normally held in contact with the side of the rack $b^2$ by a suitably-placed spring $d^{16}$. The portion $d^{14}$ of the lever $d^{11}$ is preferably provided with a foot $d^{17}$, which normally rests upon the bed B, and the inner corner $d^{18}$ of which is cut away substantially as shown by the dotted lines in Fig. 9.

The wedge $b^3$ has the vertically-inclined face $b^5$ and the laterally-inclined face $b^6$.

The plate $a'$ of the carrier A is provided with the open-ended slots $a^\times a^\times a^\times a^\times$, which allow the rolls $d^2$ and $d$ to come in contact with the ballot.

The operation of the devices above described is as follows: As the carrier A is pushed in and before it has reached the rolls $d$ and $d^2$ the vertically-inclined faces of the wedges $b^3$ engage the feet $d^{17}$ of the levers $d^{11}$ and raise said levers, and by means of the arms $d^9$ raise the shaft $d'$, raising the rolls $d$ from the roll $d^2$ and allowing the carrier A with its ballot to pass between the rolls $d$ and $d^2$. As the carrier A is farther advanced the feet $d^{17}$, reaching the laterally-inclined faces of the wedges $b^3$, fall onto the bed B and allow the rolls $d$ to fall and the rolls $d^2$, entering the open-ended slots $a^\times$, to firmly grasp the ballot. As the carrier A is withdrawn the laterally-inclined faces $b^6$ of the wedges $b^3$ engage the feet $d^{17}$ and force the portion $d^{14}$ of the levers $d^{11}$ outward against the tension of the spring $d^{16}$, so that upon their motion of withdrawal the wedges $b^3$ do not act to raise the rolls $d$, but during the withdrawal of the carrier A the racks $b^2$ act upon the gears $d^5$ to rotate the rolls $d^2$ to take the ballot from the carrier A and deposit it in the ballot-box or other receptacle.

T T represent the tally-sheets, each of which is carried upon a roll $t$ and thence passes over a roll or rod $t^3$, which supports it while being acted upon by the markers, as hereinafter described, onto a spring-pressed idle-roll $t^5$, which is held against and rotated by the feed-roll $t^4$. The rolls $t$, $t^4$, and $t^5$ are all supported by the brackets $t'$ and $t^2$, and slotted bearings 20 are provided for the roll $t^5$, so that the springs 21 can keep the roll $t^5$ and $t^4$ in contact to operate as above stated. On each of the feed-rolls $t^4$ is a ratchet $t^6$, which is engaged by a pawl $t^7$, pivoted at $t^8$ to the bracket $t'$. The pawl $t^7$ is preferably in the form of a bent lever, the free end of which when the carrier A is out (see Fig. 1) rests upon the wedge $b^4$, being held in contact therewith by the action of a suitably-placed spring $t^9$. The wedge $b^4$ is provided with the vertically-inclined face $b^8$, and the above-described arrangement is such that as the carrier A is pushed in the pawl $t^7$ is brought down upon the bed B by the action of spring $t^9$ and the ratchet $t^6$ fed ahead one tooth, rotating the feed-roll $t^4$ and advancing the tally-sheet T. When the carrier A is again withdrawn, the inclined face $b^8$ of the wedge $b^4$, engaging the pawl $t^7$, raises it on top of wedge $b^4$ and takes up a tooth on the ratchet $t^6$, leaving the pawl $t^7$ in position to feed ahead again when the carrier A is again pushed in.

We will now describe the preferred form of marking device as shown in the drawings.

A series of markers, preferably in the form of the curved fingers $f f$, &c., are mounted upon a shaft $f'$, journaled in the brackets $f^2 f^2$ on the bed-plate B.

$f^3$ represents an inking-bar, which is provided with a suitable inking-pad and which is fixedly secured by the arms $f^4 f^4$ to a shaft $f^5$, also journaled in the brackets $f^2 f^2$. To the shaft $f^5$ is fixedly secured a bent lever $f^6$, in which is formed the oblique slot $f^7$, and to the shaft $f'$ is fixedly secured the lever $f^8$, in which is formed the angular slot $f^9$.

$p$ represents a vertically-reciprocating post mounted in suitable bearings in the base B and bracket $f^2$, in which it is free to slide longitudinally and by which it is guided and held in position.

A marker $f$ is provided for each of the perforations $a^6$, and the shape of the markers $f$ and their arrangement upon the shaft $f'$ are such that when the carrier A is in its inward position a rotation of the shaft $f'$ causes each of the markers $f$ to enter one of the perforations $a^6$, and if the ballot has been perforated at such perforations $a^6$ to pass through the perforation $a^6$, through the perforation in the ballot, and through the registering perforation $a^7$ in the plate $a'$ onto the tally-sheet T, and an impression is made on the tally-sheet. If the ballot has not been perforated at any given perforation $a^6$, it is evident that the marker $f$, entering such perforation $a^6$, will be prevented by the ballot from entering the registering perforation $a^7$, and the tally-sheet T will not be marked.

The rod $p$ is provided with a laterally-projecting stud 2, which works in the inclined slot $f^7$, and with a laterally-projecting stud 3, which works in the slot $f^9$. The shape of the slots $f^7$ and $f^9$ and their position with reference to the shafts $f'$ and $f^5$ are such that (the parts being in position shown in Fig. 7) a depression of the rod $p$ first moves the inking-bar $f^3$ out of the way of the fingers $f$ and then rotates the shaft $f'$ to bring the fingers $f$ into the perforations $a^6$. The fingers $f$ are loosely mounted upon the shaft $f'$ between the bars 4 5, which extend along the shaft $f'$ and are fixedly secured thereto, so as turn therewith.

The bars 4 and 5 act as stops for the markers $f$, limiting their rotation about the shaft $f'$. Suitably-placed springs 6 upon the bar 5 are arranged to bear upon the markers $f$ and to hold them in contact with the bar 4, the above-described arrangement being such that when the markers $f$ are brought into the perforations $a^6$ by the rotation of the shaft $f'$, when the ballot has been perforated, they will pass through such perforation into the perforation $a^7$ and onto the tally-sheet T; but where there is no perforation in the ballot they will be held from further motion by the ballot, the springs 6 yielding to allow the shaft $f'$ to rotate independently. An upward movement of the post $p$ rotates the shaft $f'$ to raise the markers $f$ and rotates the shaft $f^5$ to bring the inking-bar $f^3$ in contact with the free ends of the markers $f$, so that ink is supplied upon the markers $f$ for the next operation thereof. The inclined wall of the perforations $a^6$ acts to guide the markers $f$ into the perforation $a^7$ should they strike slightly off the center. In practice we find that the ordinary machine fit gives sufficient lateral play to the markers $f$, for the purpose above stated.

We may say that in the form of our invention shown in the drawings there is upon the opposite side of the bed B a post $p$, similar to that heretofore described and similarly connected with similarly formed and arranged markers $f$ and their inking-bar $f^3$.

As shown in the drawings, the posts $p$ are connected by a connecting-rod $p'$, (see Fig. 6,) which is connected by a link $p^2$ with a swinging lever $p^3$, fulcrumed to a fixed support, by means of which the rods $p\,p$ may be raised and lowered, for the purposes heretofore stated.

The operation of the machine of the drawings has been fully described in connection with the foregoing description of the form and arrangement of its several parts. We may, however, add that in using our improved apparatus the carrier A is pushed in by the operator until the ballot is held by the rolls $d$ and $d'$, at which time the carrier A is in position for the markers $f$ to enter the perforations $a^6$, and the operator depresses the lever $p^3$ and marks the votes for the several candidates upon the tally-sheets T. The operator then raises the lever $p^3$ and withdraws the markers $f$ from the perforations $a^6$ and pulls the carrier A out, thereby causing a rotation of the roll $d^2$, which causes the ballot to travel in an opposite direction to that of the motion of the carrier into the ballot-box or other receptacle. (Not shown.) As the operator pushes in the carrier A the tally-sheets T are fed ahead, so that the impressions made upon the tally-sheets to indicate the vote for an individual candidate are made separately and in line, so that they can be readily counted at any time during or after the election. In practice the tally-sheets T T are ruled in columns and each column headed with the name of a candidate. When a ballot has been through the apparatus and the vote thereon has been recorded upon the tally-sheets, the impression made by each marker will appear opposite the name of every candidate not voted for, so that if a ballot is inserted in the ballot-box without passing through the registering apparatus it will be indicated by the face of the ballot.

Having thus described our invention and its mode of operation, we claim as novel and desire to secure by Letters Patent of the United States—

1. In an apparatus for registering votes, the combination, with a perforated stencil-ballot, of a movable tally-sheet, and a marking device arranged to mark the tally-sheet through the perforations in the stencil-ballot.

2. In an apparatus for registering votes, the combination, with a perforated stencil-ballot, of a perforated carrier therefor, certain of the perforations in which register with the perforations in the ballot, a movable tally-sheet, and a series of markers arranged to pass through the ballot and its carrier and to mark the tally-sheet.

3. In an apparatus for registering votes, the combination, with a perforated stencil-ballot, of a perforated carrier therefor certain of the perforations in which register with the perforations in the ballot, a movable tally-sheet, and a series of yielding movable markers arranged to enter the perforations in the carrier and to pass through the same onto the tally-sheet where not held by non-perforated portions of the ballot.

4. In an apparatus for registering votes the combination, with associated parts, of a ballot-carrier, and a series of depositing-rolls vertically movable with relation to each other to allow the ballot to be carried between the same by the carrier and mechanism actuated by the carrier for actuating the rolls.

5. In an apparatus for registering votes the combination, with a perforated stencil-ballot, of a reciprocating perforated carrier therefor, a tally-sheet movable transversely to the path of the carrier, a series of markers arranged to pass through the perforations in the ballot and its carrier and mark the tally-sheet, and mechanism actuated by the carrier for actuating the tally-sheet.

6. In an apparatus for registering votes, the combination, with associated parts, of a series of depositing-rolls, and a ballot-carrier provided with a series of open-ended slots which receive the rolls and permit them to come in contact with and grip the ballot on such carrier, substantially as set forth and shown.

7. In an apparatus for registering votes, a perforated carrier-plate as $a'$, having at one end a flange as $a^3$ and at the other end the open slots as $a^\times\,a^\times,\,a^\times,\,a^\times,\,a^\times$ with side flange to which are attached retaining-plates as $a^5$, perforated to register with similar perforations in said plate $a'$, substantially as shown and described.

In testimony whereof we have hereunto set our hands, in the presence of two attesting witnesses, this 25th day of January, 1896.

JAMES J. CUNNINGHAM.
EUGENE H. MULLEN.

Witnesses:
BENJAMIN PHILIPS,
A. E. WHYTE.